(12) United States Patent
Laubsch et al.

(10) Patent No.: US 11,213,053 B1
(45) Date of Patent: Jan. 4, 2022

(54) SEPARATION AND FURTHER PROCESSING OF COMMINGLED BIOMASS STREAMS CONTAINING HIGHLY VARIABLE PROTEIN AND FAT CONCENTRATIONS TO PRODUCE DIGESTIBLE PROTEINS AND FATS

(71) Applicant: Green Recovery Technologies LLC, New Castle, DE (US)

(72) Inventors: Kenneth L. Laubsch, Mullica Hill, NJ (US); Ashley A. Cephas, Clayton, DE (US); Lucas Wangen, Hayward, MN (US)

( * ) Notice: Subject to any disclaimer, the term of this patent is extended or adjusted under 35 U.S.C. 154(b) by 0 days.

(21) Appl. No.: 16/877,082

(22) Filed: May 18, 2020

(51) Int. Cl.
*A23K 20/158* (2016.01)
*C10G 3/00* (2006.01)

(52) U.S. Cl.
CPC ............. *A23K 20/158* (2016.05); *C10G 3/60* (2013.01); *C10G 2300/1014* (2013.01); *C10G 2300/1018* (2013.01)

(58) Field of Classification Search
CPC .................................. C07K 1/04; C10G 3/158
USPC .......... 426/72, 546, 646, 652; 530/412, 355, 530/205
See application file for complete search history.

(56) References Cited

U.S. PATENT DOCUMENTS

| | | | | |
|---|---|---|---|---|
| 4,402,874 A * | 9/1983 | Johnson | ..................... | A23J 1/14 426/656 |
| 4,482,574 A * | 11/1984 | Lee | ........................... | A23J 3/34 426/32 |
| 4,551,274 A * | 11/1985 | Shen | ......................... | A23J 3/16 205/700 |
| 5,171,592 A * | 12/1992 | Holtzapple | ............. | A23J 1/007 426/635 |
| 5,384,149 A * | 1/1995 | Lin | ......................... | A23L 13/30 426/646 |
| 6,005,073 A * | 12/1999 | Hultin | ....................... | A23J 1/04 530/350 |
| 6,136,959 A * | 10/2000 | Hultin | ....................... | A23J 1/04 426/656 |
| 6,451,975 B1 * | 9/2002 | Hultin | ....................... | A23L 2/66 530/350 |
| 7,763,717 B1 * | 7/2010 | Jaczynski | ............... | A23J 1/002 530/412 |
| 8,021,709 B2 * | 9/2011 | Hultin | ..................... | A23J 1/002 426/657 |

(Continued)

*Primary Examiner* — Nina Bhat

(57) ABSTRACT

Processes for separating and isolating proteins and fats from biomass matter utilizes a pH adjustment of a slurry. The biomass feedstock is derived from commingled animal and/or plant-based streams with highly variable concentrations of fat, proteins and impurities present in the biomass. A wide range of pH adjustment spanning highly acid to highly basic has been shown to be effective at separating the commingled streams into their constituent products. The processes do not rely on the proteins being solubilized into the solution, but rather solubilizing the fat portion, physically separating the constituents and precipitating the fat in a downstream process, resulting in two value streams: a highly digestible protein component and a fat component. The protein component has nutritional value as companion pet, animal and aquaculture feed ingredient and the fat component has value as standalone or blended solid or liquid biofuels, greases or specialty chemicals.

21 Claims, 6 Drawing Sheets

(56) References Cited

U.S. PATENT DOCUMENTS

| | | | | |
|---|---|---|---|---|
| 9,161,555 B2* | 10/2015 | Kelleher | ............ | A23J 1/02 |
| 9,826,757 B2* | 11/2017 | Ghorbani | ............ | B01D 35/02 |
| 10,212,960 B2* | 2/2019 | Garwood | ............ | A23L 13/60 |
| 10,568,343 B2* | 2/2020 | Sherlock | ............ | C07K 1/36 |
| 2004/0067551 A1* | 4/2004 | Hultin | ............ | A23J 1/02 |
| | | | | 435/69.1 |
| 2007/0207244 A1* | 9/2007 | Crank | ............ | A23L 7/126 |
| | | | | 426/489 |
| 2010/0124583 A1* | 5/2010 | Medoff | ............ | A23K 50/80 |
| | | | | 426/2 |
| 2012/0171345 A1* | 7/2012 | Kelleher | ............ | A23J 1/02 |
| | | | | 426/546 |
| 2015/0342224 A1* | 12/2015 | Medoff | ............ | A23K 40/10 |
| | | | | 426/63 |
| 2017/0013858 A1* | 1/2017 | Kelleher | ............ | A23J 3/04 |

* cited by examiner

FIG. 1 Batch Base Separation

FIG. 5 Esterification

SEPARATION AND FURTHER PROCESSING OF COMMINGLED BIOMASS STREAMS CONTAINING HIGHLY VARIABLE PROTEIN AND FAT CONCENTRATIONS TO PRODUCE DIGESTIBLE PROTEINS AND FATS

BACKGROUND OF THE INVENTION

Field of the Invention

The invention relates to pH adjustment processes for chemically separating and further processing of commingled biomass streams into its components, namely digestible proteins for nutrition applications and fats for precursor feedstocks in the manufacture of solid and liquid fuels, greases and specialty chemicals. The pH adjustment processes are effective at separating feedstocks containing highly variable protein and fat concentrations.

Background

Commingled meat and plant-based biomass feedstocks are routinely separated into constituents using a variety of technologies, including thermal processing and solvent extraction. There are inherent limitations in utilizing these methods for commingled streams where one of the constituents is a thermally sensitive protein and particularly when the streams have highly variable compositions of fat and protein. Thermal processing is effective at separating fat from commingled meat and plant-based biomass streams, but this comes at the expense of thermally degrading the protein and producing a residual solid protein stream that has poor digestibility. Solvent extraction generally occurs at lower temperatures than thermal processing and again is effective at fat separation and removal from the solids. However, residual solvent in the solid protein stream is generally above the toxicity limits for animal and fish nutrition and therefore must be removed using expensive steam sparging and similar methods which can also degrade protein digestibility. In both cases, the technologies at industrial scale require large capital expenditures, large operating costs, typically take a long period of processing time and produce undesirable waste streams.

Commingled plant-based streams have also used chemical reactions to precipitate solubilized proteins from solution. Techniques such as salting out/salt-induced precipitation and isoelectric precipitation have been used to precipitate solubilized protein from a solution where the starting stream contains virtually no fat or impurities. These chemical techniques are used to produce highly purified and nondenatured proteins, but the reactions do not work in the presence of fat or impurities, which disrupt the ionic potential and charge profile of the solution, making the yields commercially non-viable.

SUMMARY OF THE INVENTION

The invention is directed to pH adjustment processes for separating and isolating proteins and fats from biomass matter derived from commingled animal and/or plant-based streams with highly variable concentrations of fat, proteins and impurities present in the biomass. A wide range of pH adjustment spanning highly acid to highly basic has been shown to be effective at separating the commingled streams into their constituent products. The processes do not rely on the proteins being solubilized into the solution, but rather solubilizing the fat portion, physically separating the constituents and precipitating the fat in a downstream process, resulting in two value streams: a highly digestible protein component and a fat component. The protein component has nutritional value as companion pet, animal and aquaculture feed ingredient and the fat component has value as stand-alone or blended solid or liquid biofuels, greases or specialty chemicals.

In an exemplary embodiment, a biomass feedstock may include a feedstock concentration of a protein component, fat component, water and impurities. The feedstock protein component concentration may be from about 2.5% to 66% by weight of the biomass feedstock. The feedstock fat component concentration, which may include a fat component that may include, but is not limited to, monoglycerides, diglycerides, and triglycerides, free fatty acids, oils, greases and related lipids, may be from about 2.5% to 66% by weight of the biomass feedstock. The feedstock water concentration may be from about 8% and 95% by weight of the biomass feedstock. The feedstock impurities, which are typically ash or fiber, may be from about 2% to 10% by weight. It may be preferred that the feedstock protein concentration is at least 10%, the feedstock fat component concentration is less than about 10% and the feedstock water concentration is less than 90%. An exemplary feedstock may be biologically active or inactive, wet or dry, flocculated or not flocculated.

When the biomass has a free fatty acid concentration of less than 15%, the biomass pH may be adjusted by the addition of acid solutions to produce an acidic biomass slurry. When the free fatty acid is between about 2.5% and 80%, the biomass pH may be adjusted by the addition of a basic solution to produce a basic biomass slurry.

An exemplary process for separating and isolating proteins and fats from a commingled biomass feedstock may include an initial step of particle sizing the biomass feedstock to produce a particle sized biomass having an average particle size of between 500-20,000 microns, or of between about 1,000 and 5,000 microns, or no more than about 10,000 microns, and with about 2,500 microns being preferred. Particle sizing may be performed with a colloidal mill if the feedstock is a wet slurry or a disintegrator mill if the feedstock is in dry form or similar devices. It may be preferred that a biomass stream for particle sizing be biologically inactive and initially dewatered to produce a dewatered biomass having no more than 10% water by weight for dry form and no more than 95% water for wet forms. Particle sizing may be observed and measured utilizing a commercial instrument utilizing any of the following techniques: Coulter principle, laser diffraction, light scattering or polarized intensity differential scattering, with the Coulter principle being preferred. Particle size, including average particle size, may be determined using a particle size analyzer, available from Beckman Coulter, Indianapolis, Ind.

An exemplary process for separating and isolating proteins and fats from a commingled biomass feedstock may incorporate making a basic slurry of the particle-sized biomass by mixing the particle sized biomass and a suitable base solution to produce a basic slurry, having a basic pH, a pH of 8 or more and preferably a pH of 10 or higher. It may be preferred that sodium hydroxide is used. However, potassium hydroxide or other suitable bases may also be used. Molar concentrations of the sodium hydroxide may range from 0.05 to 10 molar, with 0.5 molar preferred to effect solubilization of the fats without chemically altering the protein.

The basic slurry may be mixed for a mixing time, also referred to as contact time, of at least one minute or more and preferably about ten minutes or more to solubilize the fats to produce a basic slurry comprising solubilized fat solution containing a solubilized fat component and a dispersed protein component dispersed in the slurry, wherein the dispersed protein component comprises a basic pH nonreacted protein and solid impurities derived from the particle sized biomass. Solid concentration in the slurry may range from about 3 to 50%, with 15% being typical.

The mixing may be conducted with a mechanical mixer, such as a shear mixer to promote interspersion of the fats and dispersed protein component within the basic slurry. This mixing step initiates fat hydrolysis, where the fat component in the mixture starts to solubilize and separate from the protein. The mixing of the basic slurry drives the fat hydrolysis reaction of the fats to fatty acid salts and glycerol or similar alcohol. As the reaction occurs, the fats are solubilized and the non-fat solids, namely proteins, fiber and ash, for meat-based streams, and proteins, carbohydrates, fiber and ash, for plant-based streams, are separated from the solubilized fat solution as non-fat solids. For this process, contact times range from 5 minutes to up to 12 hours, with 15 to 30 minutes being typical.

During the mixing and fat solubilization step, the basic pH slurry may be heated to assist in hydrolyzing the fats. The basic pH slurry may be heated to a temperature to ensure that the proteins in the dispersed protein component are not denatured. The basic slurry may be heated to a temperature of about 80° F. to a temperature of about 140° F., or a temperature of about 90° F. to 120° F., or a temperature of about 95° F. to 115° F. and any range between and including the values provided.

Once the reaction has gone to near-completion, wherein at least 80% of the fat has been hydrolyzed, the pH of the elevated basic pH solution may be brought back to a neutral pH by adding acid, or an acid solution, of the correct molarity and volume in order to stop any reaction of the base with the protein solids fraction. Reaction of the base on the protein solids fraction may be halted by titrating the solution with an acid to bring the pH of the solution down to about 8 or less or to about 7 or less or to about 6 or less and any range between and including the pH values provided. Any suitable acid may be used including, but not limited to, Hydrochloric Acid (HCl), Sulfuric Acid (H2SO4) or similar mineral acid; all proving effective at various molarities and concentrations.

Alternatively, once the reaction has gone to near-completion, the hydrolyzed liquid layer, or solubilized fat solution, may be removed from the top of the reaction vessel and isolated for further processing. The reaction of the base on the non-fat solids may then be halted by washing the protein-rich non-fat solids that remain in the reaction vessel with water to neutralize the base. Various forms of water can be used, including tap, distilled, reverse osmosis and deionized water to form the neutralization reaction.

The components of the basic pH slurry may be separated either in a batch process or continuous batch or continuous process, wherein the solubilized fat solution is separated from the dispersed protein component to produce a separated solubilized fat component and a separated protein component. For batch basic separation process, the dispersed protein component and solubilized fat solution may be separated by allowing the mixture to decant under 1 G of gravity utilizing a gravity decanter or a suitable filtration device. For a continuous basic separation process, the dispersed protein component and solubilized fat solution are separated by automating the process using a mechanically, hydraulically or electrically-driven decanting centrifuge or similar piece of equipment suited for separating solids from liquids. G forces range from 1 G for a non-automated gravity decanting process to 2,500 G to 10,000 G for an automated process, with 4,000 G preferred. In any case, some of the supernatant may be recycled to make the initial base solution in order to decrease the chemical cost of the process and/or to reprocess the supernatant meet the yield requirement of the process.

In either a batch or continuous process, the protein component, which includes liquid holdup, may be mechanically pressed using a screw press, leaf filter press, volute press or similar piece of equipment to remove residual liquid as known as holdup. The protein and non-fat solids component may be dried using thermal energy in a manner to preserve digestibility of the proteins, or a digestibility preservation drying process, wherein the resulting dried protein has about 70% digestibility or more, about 80% digestibility or more, about 90% digestibility or more. An exemplary digestibility preservation drying process may be a near ambient temperature/long duration dewatering or drying process such as a low temperature vacuum dryer, conical dryer or other low temperature drying techniques, resulting in a digestible protein that has a digestibility of at least 50%. Drying temperatures for low temperature/long duration drying may be in the range of 105-140° F. for less than 8 hours for near ambient temperature dewatering or drying processes. Low temperature drying may be performed at a temperature of about 140° F. or less, about 130° F. or less, about 120° F. or less, about 110° F. or less, about 95° F. or less and may range between and including the low temperature drying temperatures provided.

Alternatively, the protein component containing liquid holdup may be mechanically pressed using a screw press, leaf filter press, volute press or similar piece of equipment to removed residual liquid holdup and may be further subjected to an exemplary digestibility preservation drying process that employs a high temperature/short duration dewatering or drying process. Spray dryers, pulse combustion dryers or similar pieces of equipment that subject the material to higher drying temperatures, such as about 350° F. to about 850° F., but for an extremely short duration, such as less than 3 seconds, have been used to dry the separated protein component to produce a dried protein that has about 70% digestibility or more, about 80% digestibility or more, about 90% digestibility or more.

The separated solubilized fat solution may be further processed into a fuel grease, or specialty chemical by adding acid and heat to the mixture, and precipitating a viscoelastic fat component, with a yield of up to 90%. Any suitable acid may be used for the acidification reaction, including, but not limited to, Hydrochloric Acid (HCl) and Sulfuric Acid (H2SO4) all proving effective at various molarities. The process may be batch, continuous batch or continuous. In any case, the supernatant liquid stream that is produced from separation may be recycled to make the acid solution, thereby reducing cost and chemical usage of the process and/or to reprocess the supernatant to meet the yield requirement of the process.

For an exemplary batch basic process, the solubilized fat solution treated with acid may be separated from the viscoelastic fat component material by allowing the mixture to decant under 1 G of gravity utilizing a gravity decanter or a suitable filtration device. For a continuous basic process, the solubilized fat solution treated with acid may be separated from the viscoelastic fat component material by automating the process using a mechanically, hydraulically or electrically-driven decanting centrifuge or similar piece of equipment. G forces range from 1 G for a non-automated gravity decanting process to 2,500 G to 10,000 G for an automated process, with 6,000 g preferred.

As an alternative to the basic pH protein and fat separation process, an acidic pH process may be used to separate fats and proteins from a commingled biomass stream with highly variable protein and fat content. In an exemplary acid pH altering process, instead of adding a base to the commingled stream to raise the pH, an acid, such as Hydrochloric Acid (HCl) or Sulfuric Acid (H2SO4), is added the commingled biomass at the correct molarities, mechanical mixing levels and temperatures to produce an acidic slurry. This acidic slurry is further processed to create a separated protein component and a fat component. The protein-rich separated protein component is dried to produce highly digestible proteins and the fat solution can be further processed into biofuel using esterification and transesterification processes. Esterification is the conversion of carboxylic acids to esters via the usage of alcohols and acids (Weldegima 2018). Transesterification is a reaction of an alcohol with triglycerides to produce a fatty acid ester and glycerol. It is important that the commingled biomass feedstock is less than 15% free fatty acids for the acid-based process, or the separation yields can be less than 50%.

Regardless of whether the separation process is basic or acidic, if the initial biomass was derived from a food grade feedstock, the proteins produced could be used for human nutrition and the fats used for cosmetics, specialty chemicals & pharmaceuticals. Food grade feedstocks may consist of animal-based feedstock, including, but not limited to, non-waste originated solids, meat, eggs, etc. and/or plant feedstock including, but not limited to, wet distiller grains, wet beer grains, vegetable pomaces from carrots, tomatoes, kale, etc. and fruit pomaces, skins and whole forms of cranberry, apples, oranges, pineapple etc.

Biomass, as used herein, is defined as any organically-derived matter, either in waste or whole product, plant or meat-based, that can be used as a food and/or energy source.

Bioactive, as used herein, is defined as an organic or inorganic material containing biological agents such as bacteria, viruses, molds, mildews, yeasts, and the like, that have the effect of degrading consuming or digesting the material thereby losing value.

Bio-inactive, as used herein, is defined as an organic or inorganic material where biological agent activity has been suspended based on thermal, chemical or related treatments. A bio-inactive material may not be sterile, but the biological agents are not able to grow and propagate due to low moisture, low oxygen, high chemical, high pH characteristics. There are numerous test kits available commercially that use biological, biochemical, molecular or chemical methods for the detection, identification or enumeration of microorganism activity in a material.

Impurities, as used herein may include ash, fiber and related non-nutritional content.

Protein component, as used herein, includes protein molecules consisting of many amino-acids connected by "peptide linkages," long-chain proteins and their building block derivatives, including amino acids, peptides & polypeptides.

Fat component, as used herein, includes fat molecules that generally consist of two parts: a glycerol backbone and three fatty acid tails. Glycerol is an organic molecule with three hydroxyl (OH) groups, while a fatty acid consists of a long hydrocarbon chain attached to a carboxyl group. Fat component includes fats and their building block or disassembled derivatives, namely greases, ohs, glycerol and similar alcohols, and fatty acids and fatty acid esters and fatty acid salts.

Non-fat solids (NFS) as used herein, includes namely protein, fiber, ash, and solid-form impurities, for meat-based streams, and proteins, carbohydrates, fiber, ash and solid-form impurities, for plant-based streams. Non-fat solids are separated from the solubilized fat solution as non-fat solids.

Free fatty acids composition, as used herein, includes fatty acids, fatty esters, fatty acid salts and similar derivatives that are produced from triglycerides by hydrolytic reactions in any of the steps of the process and include their derivatives.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
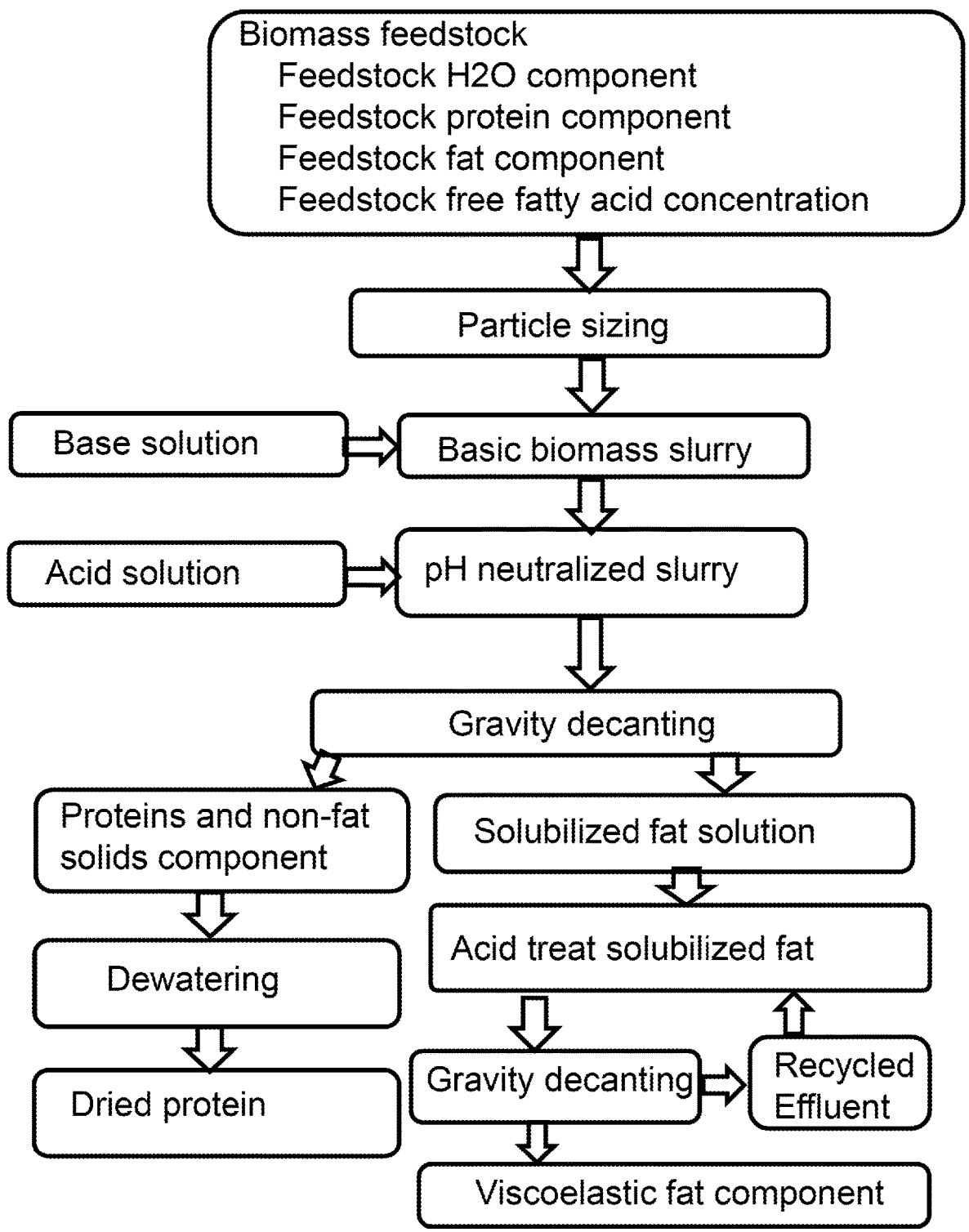
FIG. 1 shows an exemplary process for producing separated streams of a digestible dried protein component and a fat component from a commingled biomass stream with highly variable protein and fat concentration using a batch or continuous batch basic pH (i.e. pH greater than 7) reaction.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary batch or continuous batch base separation process for producing separated components from a biomass feedstock includes particle sizing the feedstock and treating the biomass with a base to form a basic biomass slurry. The biomass feedstock has an original or feedstock water component, protein component, fat component and free fatty acid concentration. The fat in the basic biomass slurry is solubilized and separated from the protein and non-fat solid component. The basic biomass slurry may be mixed for a mixing time and heated to a certain temperature to increase the rate of fat solubilizing. An acid may be added to neutralize the basic slurry after an effective amount of the fat is solubilized. The fat component and protein component may be separated, such as by gravity decanting. The separated protein component, including a non-fat solid component, is then dewatered to produce a dried protein component. The separated protein component and non-fat solid component may be subjected to thermal energy that maintains digestibility of the protein, such as a long duration/low temperature drying process or a short duration/higher temperature drying process, as described herein. The solubilized fat solution, containing the lipid and lipid derivatives may then be further processed into a viscoelastic fat component. The solubilized fat solution may be acid treated and gravity decanted to produce the viscoelastic fat component. Liquid effluent streams may be recycled to produce the process chemicals, thereby improving the efficiency and economics of the process.

Figure 2:
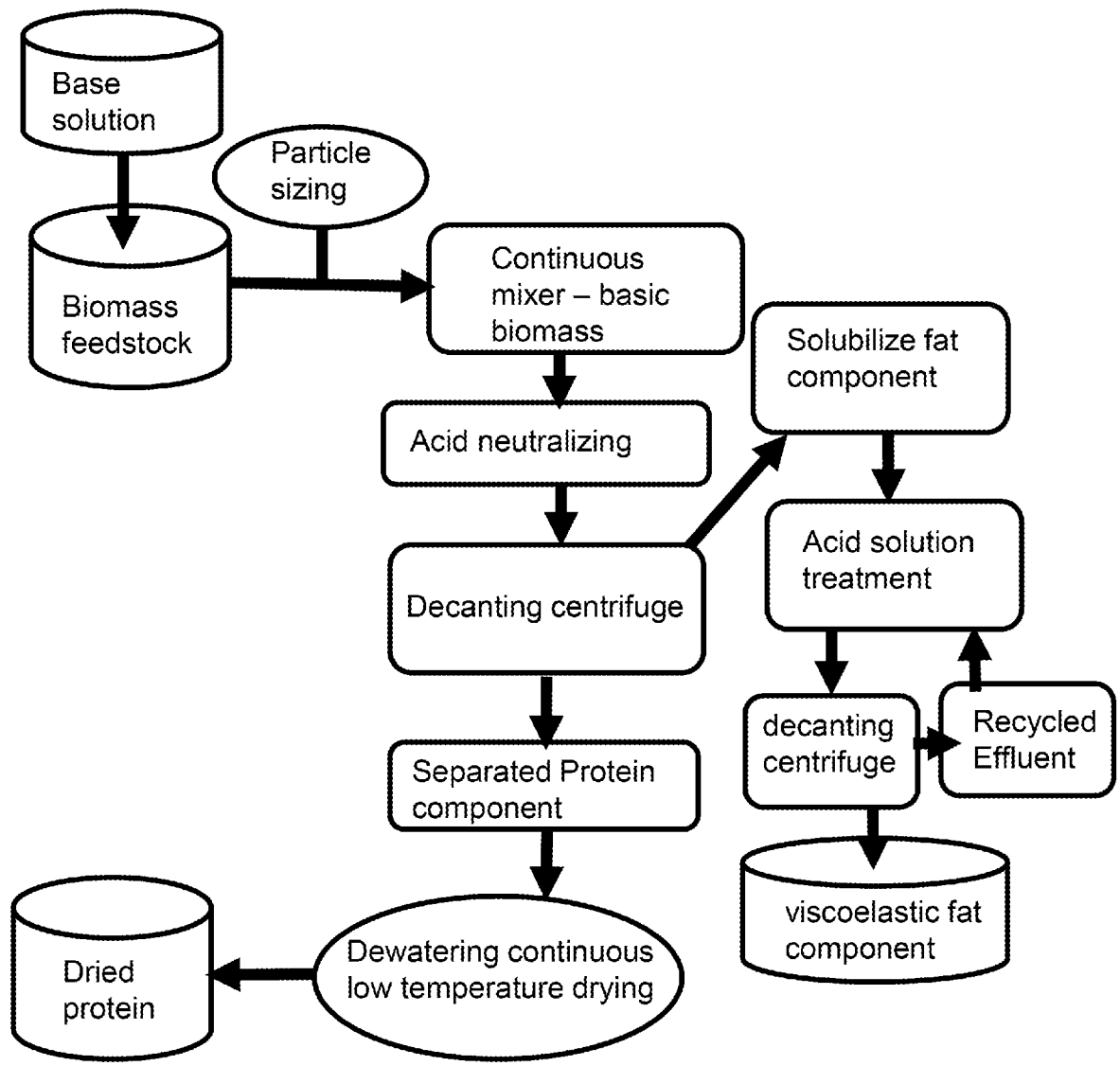
FIG. 2 shows an exemplary process for producing separated streams of a digestible dried protein and a fat component from a commingled biomass stream with highly variable protein and fat concentration using a continuous basic (i.e. pH greater than 7) reaction.

As shown in FIG. 2, an exemplary continuous base separation process for producing separated components from a biomass feedstock includes particle sizing a biomass feedstock that has been treated with a base to produce a basic biomass. The particle sized basic biomass slurry is fed to a continuous mixer where the fat is solubilized. An acid may be added to neutralize the basic slurry after an effective amount of the fat is solubilized. A decanting centrifuge or similar process equipment may be used to remove the solubilized fat from the protein and non-fat solid component. The protein and non-fat solid component is then dewatered to produce a dried protein. The protein and non-fat solid component may be subjected to thermal energy that maintains digestibility of the protein, such as a long duration/low temperature drying process or a short duration/ higher temperature drying process, as described herein. The solubilized fat solution, containing the lipid and lipid derivatives may then be further processed into a viscoelastic fat component. Liquid effluent streams may be recycled to produce the process chemicals, thereby improving the efficiency and economics of the process. An effluent stream is a liquid stream that contains the remainder of the protein component, fat component and free fatty acid after the separation process.

Figure 3:
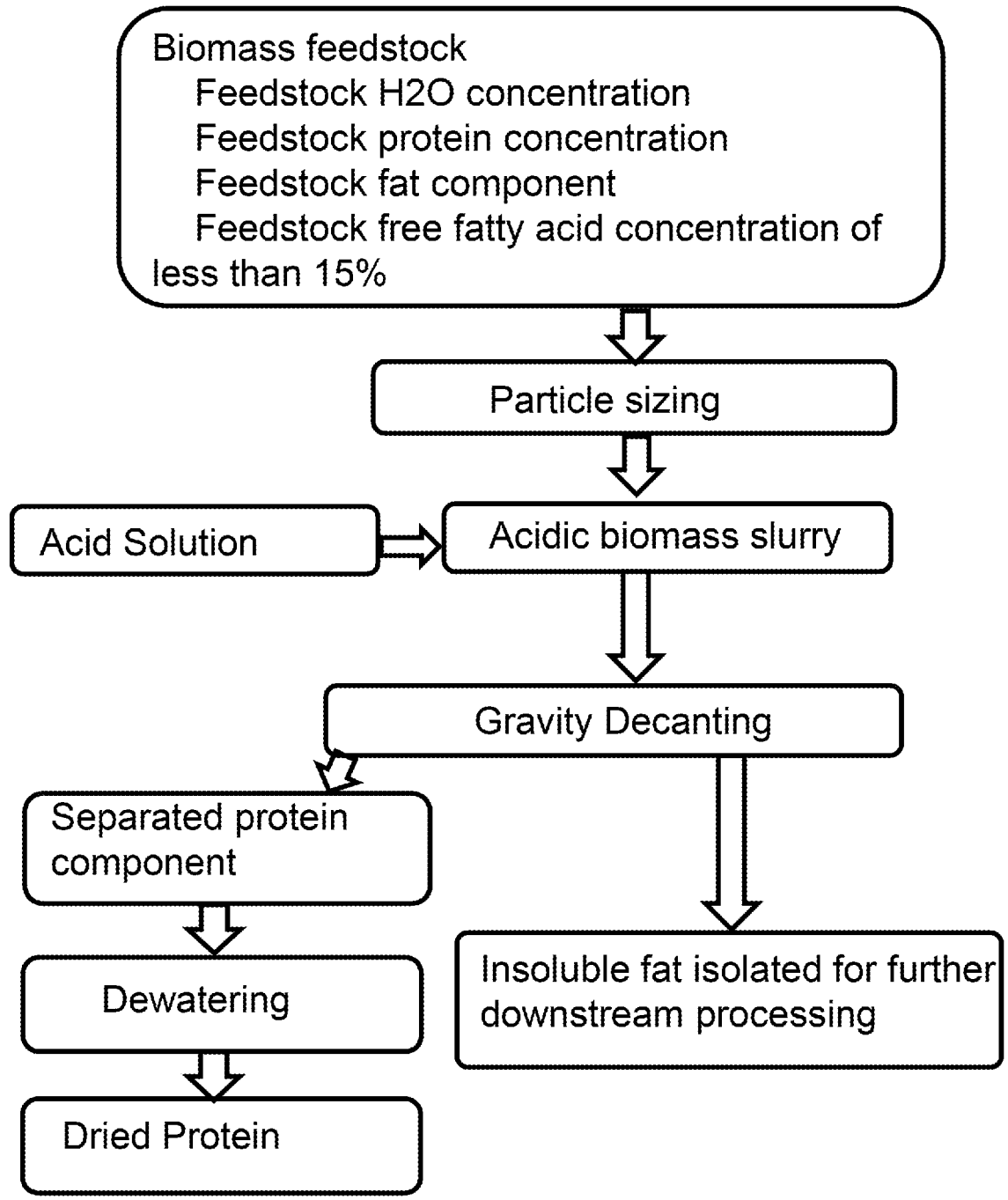
FIG. 3 shows an exemplary process for producing separated streams of a digestible dried protein and a fat component from a commingled biomass stream with highly variable protein and fat concentration using a batch or continuous batch acidic (i.e. pH less than 7) reaction.

As shown in FIG. 3, an exemplary batch or continuous batch acid separation process for producing separated components from a biomass feedstock includes particle sizing the feedstock and treating the biomass with an acid to form an acidic biomass slurry. The fat in the acidic biomass slurry is insolubilized and separated from the protein and non-fat solid component. The acidic biomass slurry may be mixed for a mixing time and heated to a certain temperature to increase the rate of fat solubilizing. The protein and non-fat solid component is then dewatered to produce a dried protein. The protein and non-fat solid component may be subjected to thermal energy that maintains digestibility of the protein, such as a long duration/low temperature drying process or a short duration/higher temperature drying process, as described herein. The insolubilized fat solution, containing the lipid and lipid derivatives may then be further processed into biofuel or like products.

Figure 4:
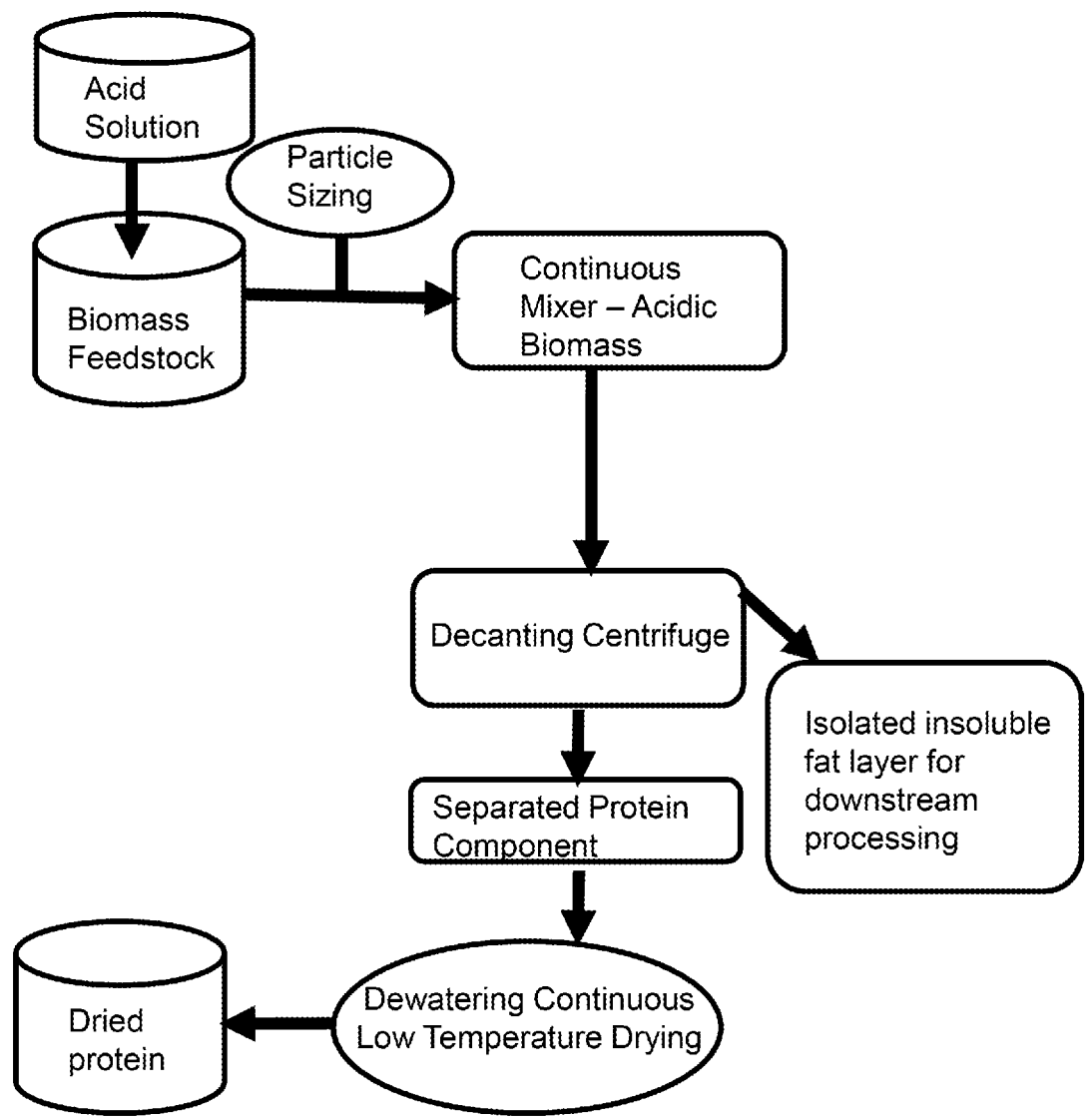
FIG. 4 shows an exemplary process for producing separated streams of a digestible dried protein and a fat component from a commingled biomass stream with highly variable protein and fat concentration using a continuous acidic (i.e. pH less than 7) reaction.

As shown in FIG. 4, an exemplary continuous acid separation process for producing separated components from a biomass feedstock includes particle sizing a biomass feedstock that has been treated with an acid to produce an acidic biomass. The particle sized acidic biomass slurry is fed to a continuous mixer where the fat is insolubilized. A decanting centrifuge or similar process may be used to remove the insolubilized fat from the protein and non-fat solid component. The protein and non-fat solid component is then dewatered to produce a dried protein. The protein and non-fat solid component may be subjected to thermal energy that maintains digestibility of the protein, such as a long duration/low temperature drying process or a short duration/ higher temperature drying process, as described herein. The insolubilized fat solution, containing the lipid and lipid derivatives may then be further processed into biofuel or like products.

Figure 5:
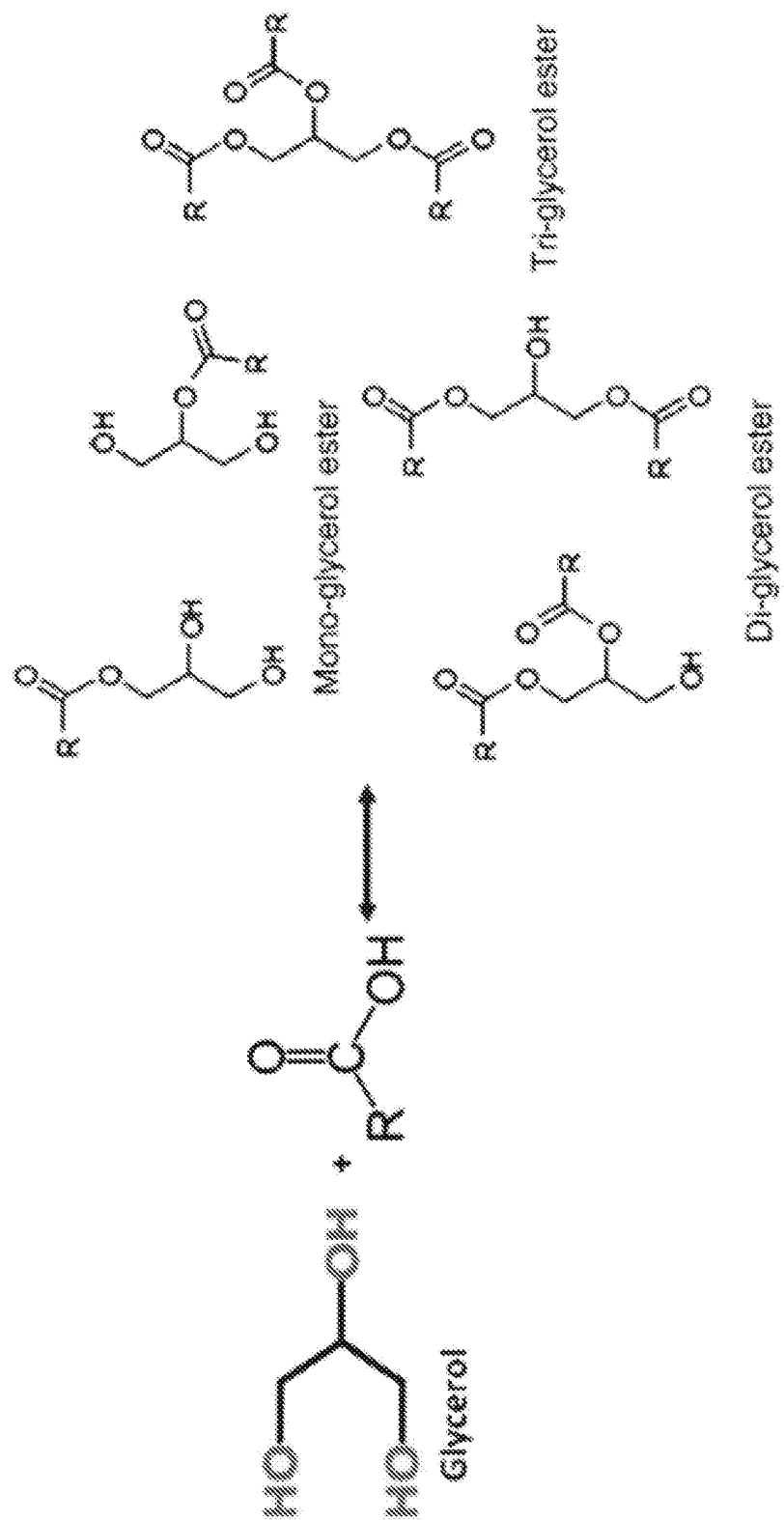
FIG. 5 shows esterification reaction in chemical equation form.

FIG. 5 shows esterification reaction in chemical equation form.

Figure 6:
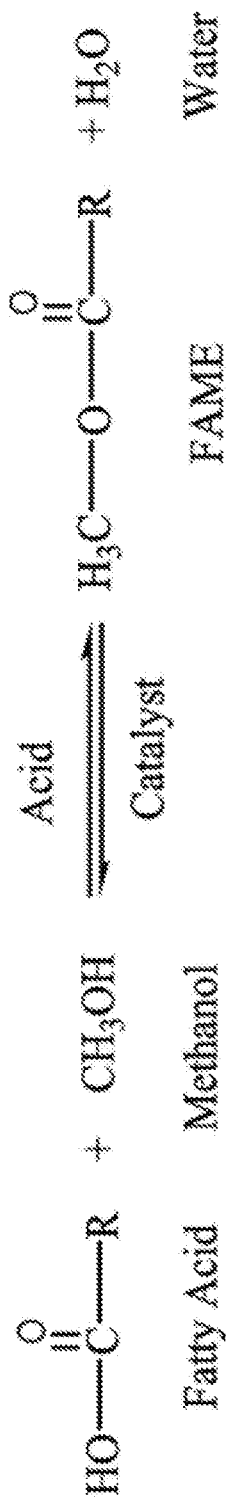
FIG. 6 shows transesterification reaction in chemical equation form.

FIG. 6 shows transesterification reaction in chemical equation form.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A process for separating and isolating a protein component and a fat component from a commingled bioactive biomass feedstock comprising:
  a) providing said commingled bioactive biomass feedstock comprising:
    i) a feedstock protein component having a concentration of between 2.5% and 66% by weight of the bioactive biomass feedstock;
    ii) a feedstock fat component having a feedstock fat concentration of between 2.5% and 66% by weight of the bioactive biomass feedstock;

iii) a feedstock free fatty acid concentration of between 5%-80% by weight of the feedstock fat concentration of the bioactive biomass feedstock; and iv) a feedstock water concentration of between 8% and 95% by weight of the bioactive biomass feedstock;

b) subjecting the biomass feedstock to particle sizing to produce a particle sized biomass having an average particle size of between 500-20,000 microns;

c) adding a base solution to the particle sized biomass and mixing for a mixing time of at least one minute to produce a basic slurry having a pH of greater than 8;

d) heating the basic slurry to a temperature of between 80° F. and 140° F. for at least one minute to assist in solubilizing the fat to produce a solubilized fat solution containing a solubilized fat component and a dispersed protein component, said solubilized fat solution having a solid concentration from 15% to 50%;

e) pH neutralizing the basic slurry using an acid to produce a pH neutralized slurry;

f) separating the pH neutralized slurry into the solubilized fat component and a separated protein component in a single mechanical process utilizing a press or a centrifuge;

g) dewatering the separated protein-component to produce a protein rich separated protein component having a water concentration of no more than 10%, wherein the dewatering is performed in a digestibility preservation process having a drying temperature and drying time to maintain at least 70% digestibility of the protein rich separated protein component;

wherein the drying temperature is 95° F. or more;

h) treating the separated solubilized fat solution with an acid in order to precipitate the solubilized fat component from the solution to produce a precipitated fat solution; and i) subjecting the precipitated fat solution to centrifugation in order to separate viscoelastic fat component from the precipitated fat solution.

2. The process of claim 1, wherein dewatering is performed in a low-temperature long duration process, wherein the dewatering temperature is no more than 140° F. and the dewatering time is no more than 8 hours.

3. The process of claim 1, wherein dewatering is performed in a high temperature-short duration process, wherein the dewatering temperature is no more than 850° F. and the dewatering time is no more than 3 seconds.

4. The process of claim 1, wherein mixing is performed with a mechanical mixer to promote interspersion of the dispersed protein component with the basic slurry.

5. The process of claim 1, wherein the basic slurry has a solids concentration of between 3% and 50%.

6. The process of claim 1, further comprising heating the basic slurry to a temperature of between 95° F.-120° F. during mixing to promote separation while preserving digestibility of the dispersed protein component.

7. The process of claim 1, wherein pH neutralization includes titrating the basic slurry with an acid until a neutral pH of between 6 and 8 is achieved.

8. The process of claim 1, wherein pH neutralization includes washing the separated protein component with water until a neutral pH is achieved.

9. The process of claim 1, wherein a centrifugation is used for separating the solubilized fat solution from the dispersed protein component at a G force of between 1 G (for gravity) and 10000 G.

10. The process of claim 1, wherein a centrifugation is used for separating a precipitated fat from the pH neutralized slurry at a G force of between 1 G and 10000 G.

11. The process of claim 1, wherein the biomass feedstock comprises animal-based biomass.

12. The process of claim 1, wherein the biomass feedstock comprises plant-based biomass.

13. The process of claim 1, wherein the step of separating the pH neutralized slurry into the solubilized fat component and a separated protein component utilizes centrifugation to produce a liquid effluent stream that is recycled into the step of adding a base solution to the particle sized biomass to produce a basic slurry.

14. A process for separating and isolating a protein component and a fat component from a commingled biomass feedstock under acidic conditions comprising:

a) providing said bioactive biomass feedstock comprising:

i) a feedstock protein component having a concentration of between 2.5% and 66% by weight of the bioactive biomass feedstock;

ii) a feedstock fat component having a feedstock fat concentration of between 2.5% and 66% by weight of the bioactive biomass feedstock;

iii) a free fatty acid concentration of less than 15% by weight of the feedstock fat concentration of the bioactive biomass feedstock; and iv) a feedstock water concentration of between 8% and 95% by weight of the bioactive biomass feedstock;

b) subjecting the biomass feedstock to particle sizing to produce a particle sized biomass having an average particle size of between 500-20,000 microns;

c) adding an acid solution to the particle sized biomass and mixing for a mixing time of at least one minute to produce an acidic slurry having a pH of less than 6;

d) heating the acidic slurry to a temperature of between 80° F. and 140° F. for at least one minute to assist in insolubilizing the fat to produce an insolubilized fat solution containing an insolubilized fat component and a protein component, said insolubilized fat solution having a solid concentration from 15% to 50%;

e) separating in a single mechanical process utilizing a press or a centrifuge, the insolubilized fat component and the protein component to produce a separated insolubilized fat component and a separated protein component; and f) dewatering the separated protein component to produce a protein rich separated protein component having a water concentration of no more than 10%, wherein the dewatering is performed in a digestibility preservation process having a drying temperature and drying time to maintain at least 70% digestibility of the protein rich separated protein component;

wherein the drying temperature is 95° F. or more.

15. The process of claim 14, wherein dewatering is performed in a high temperature-short duration process, wherein the drying temperature is no more than 800° F. and the drying time is no more than 3 seconds.

16. The process of claim 14, wherein mixing is performed with a mechanical mixer to promote interspersion of the protein component with the basic slurry.

17. The process of claim 14, further comprising heating the acidic slurry to a temperature of between 95° F.-135° F. during mixing to promote separation while preserving digestibility of the protein component.

18. The process of claim 14, wherein the basic slurry has a solids concentration of between 3% and 50%.

19. The process of claim 14, wherein a centrifugation is used for separating the insolubilized fat component from the protein component at a G force of between 1 G and 10000 G.

20. The process of claim 14, wherein the biomass feedstock comprises animal-based biomass.

21. The process of claim 14, wherein the biomass feedstock comprises plant-based biomass.

* * * * *